US012772346B2

(12) United States Patent
Kim et al.

(10) Patent No.: US 12,772,346 B2
(45) Date of Patent: Oct. 20, 2026

(54) POWER CONVERSION DEVICE FOR ELECTRIC RANGE, AND CONTROL METHOD THEREOF

(71) Applicant: COWAY CO., LTD., Gongju-si (KR)

(72) Inventors: Young Kook Kim, Gongju-si (KR); Kyo Eon Oh, Gongju-si (KR); Yeon Soo Seong, Gongju-si (KR); Eui Soon Lee, Gongju-si (KR)

(73) Assignee: COWAY CO., LTD., Gongju-si (KR)

( * ) Notice: Subject to any disclaimer, the term of this patent is extended or adjusted under 35 U.S.C. 154(b) by 740 days.

(21) Appl. No.: 18/252,234

(22) PCT Filed: Oct. 8, 2021

(86) PCT No.: PCT/KR2021/013866

§ 371 (c)(1),
(2) Date: May 9, 2023

(87) PCT Pub. No.: WO2022/102983

PCT Pub. Date: May 19, 2022

(65) Prior Publication Data

US 2023/0422356 A1 Dec. 28, 2023

(30) Foreign Application Priority Data

Nov. 11, 2020 (KR) ........................ 10-2020-0150183

(51) Int. Cl.
*H05B 6/04* (2006.01)
*H02J 50/12* (2016.01)
*H05B 6/12* (2006.01)

(52) U.S. Cl.
CPC ................ *H05B 6/04* (2013.01); *H02J 50/12* (2016.02); *H05B 6/1209* (2013.01)

(58) Field of Classification Search
CPC ........ H05B 6/04; H05B 6/062; H05B 6/1209; H02J 50/12; H02M 7/48
See application file for complete search history.

(56) References Cited

U.S. PATENT DOCUMENTS

2007/0230987 A1 10/2007 Yamashita

FOREIGN PATENT DOCUMENTS

CN 108631617 A * 10/2018 ............ H02M 7/217
DE 102013220734 B3 * 12/2014 ............ H05B 6/062
(Continued)

OTHER PUBLICATIONS

Korean Notice of Allowance issued Nov. 17, 2025 in Korean Patent Application No. 10-2020-0150183, citing document 1 therein, 6 pages.

(Continued)

*Primary Examiner* — Thien S Tran
(74) *Attorney, Agent, or Firm* — Oblon, McClelland, Maier & Neustadt, L.L.P.

(57) ABSTRACT

Disclosed are a power conversion device for an electric range, and a control method thereof. The control method according to one embodiment of the present invention comprises: receiving a user's selection of the number of outputs through an interface unit, and determining the resonance frequency from the number of outputs and an object to be heated; comparing a rectified voltage and the voltage at both ends of a switching element, and generating a switching timing reference signal; and determining a delay time according to the difference between the resonance frequency and the frequency of the switching timing reference signal, and outputting a switching control signal that turns on after the delay time has passed since the falling edge of the switching timing reference signal.

7 Claims, 8 Drawing Sheets

(56) References Cited

FOREIGN PATENT DOCUMENTS

| | | | | | |
|---|---|---|---|---|---|
| ES | 2661556 | T3 | * | 4/2018 | ............. H05B 6/062 |
| JP | 2000299182 | A | * | 10/2000 | |
| JP | 2007-188771 | A | | 7/2007 | |
| JP | 2011-165418 | A | | 8/2011 | |
| JP | 2012089433 | A | * | 5/2012 | |
| JP | 5830710 | B2 | | 12/2015 | |
| KR | 10-0692634 | B1 | | 3/2007 | |
| KR | 10-2019-0110808 | A | | 10/2019 | |

OTHER PUBLICATIONS

International Search Report mailed on Jan. 19, 2022 in PCT/KR2021/013866 filed on Oct. 8, 2021 (citing references 1 & 15-18 therein, 2 pages).

* cited by examiner

POWER CONVERSION DEVICE FOR ELECTRIC RANGE, AND CONTROL METHOD THEREOF

CROSS-REFERENCE TO RELATED APPLICATIONS

This application claims priority to and the benefit of Korean Patent Application No. 10-2020-0150183, filed on Nov. 11, 2020, the disclosure of which is incorporated herein by reference in its entirety.

BACKGROUND

1. Field of the Invention

The present invention relates to a power conversion device for an electric range and a control method thereof.

2. Discussion of Related Art

In the $20^{th}$ century, the awareness of fossil fuels has increased due to global warming and abnormal climate, and due to regulations thereon, the use of eco-friendly induction heating goes beyond the conventional industrial fields such as metal melting, heat treatment and welding, and it is increasingly being used in households as well. Induction heating at home is mainly used in cookers such as electric rice cookers, induction cooktops and induction ranges.

With the development of power semiconductor devices that are capable of high-speed switching, the high-frequency technology of inverters, which are power converters for induction heating cookers, is also being researched and developed. Although there is an advantage in that passive elements such as inductors and capacitors may become small and lightweight due to the high frequency of the power conversion device, there is a disadvantage in that the switching loss of the power semiconductor is increased due to an increase of the operating frequency. Therefore, many researches have been conducted on the resonant inverter technology that can reduce switching loss and reduce switching noise even in high frequency operation.

The circuit method of a resonant inverter used in an induction heating cooker is classified into a full bridge, a half bridge and a single-ended type according to the capacity and usage method. The single-ended resonant inverter is widely used because of its simple configuration and low price due to the small number of elements.

FIG. 1 is a circuit diagram of a single-ended resonant inverter used in an induction heating cooker. Such a single-ended resonant inverter can significantly reduce switching loss through the zero-voltage switching operation, but has a characteristic in that the voltage across a switch occurs to be large because voltage resonance is used. Therefore, the insulated-gate bipolar transistor (IGBT), which is a high withstand voltage device and has a high current rating and low conduction loss, is mainly used as a switching element.

The inputs of the inverter are simply composed of a rectifier, a choke coil and a DC link capacitor. In this case, a DC link capacitor with a small capacity is used to obtain a high power factor only by operating the inverter without a separate power factor correction circuit. Therefore, the DC link voltage becomes an unsmoothed pulsating current.

The resonance tank has a structure in which a container and a working coil are represented in series with an equivalent inductance Lr and an equivalent resistance Req, and a resonance capacitor Cr is connected in parallel thereto. The operation of the single-ended resonant inverter can be analyzed by dividing it into four modes as shown in FIG. 2.

FIG. 2 is an exemplary diagram for explaining the operation of the resonant inverter of FIG. 1, and FIG. 3 shows theoretical waveforms of voltage and current in each mode.

(a) of FIG. 2 is a mode in which the resonance energy transferred from the resonance capacitor Cr to the load and the equivalent inductance by parallel voltage resonance in the previous mode is regenerated as a DC link, from $t_0$ to $t_1$ of FIG. 3. In this case, since the current flows through the antiparallel diode of the IGBT, the voltage across both ends of the collector-emitter of the switching element becomes zero potential during $t_0$ to $t_1$. Therefore, zero voltage switching is performed by turning on the IGBT in this section.

(b) of FIG. 2 is a mode in which energy is supplied to the load and working coil from the DC link, from $t_1$ to $t_2$ in FIG. 3. When the IGBT is turned on, the direction of current is changed, and the current flows from the DC link power source through the working coil and the IGBT. At $t_2$, the switching element is turned off and charging of the resonance capacitor is started. In this case, since the IGBT collector-emitter voltage rises With a low dv/dt, if the loss due to the tail current of the IGBT is ignored, it can be considered as zero voltage switching.

(c) of FIG. 2 is a mode in which parallel resonance is performed between the equivalent inductor Lr and the resonance capacitor Cr, from $t_2$ to $t_3$ of FIG. 3. From the time point $t_2$ when the IGBT is turned off, the voltage across both ends of the collector-emitter of the IGBT rises to a low dv/dt to reach the DC link voltage Vdc, and parallel resonance starts between the equivalent inductor and the resonance capacitor. In this case, the energy stored in the equivalent inductor is transferred to the load and the resonance capacitor.

(d) of FIG. 2 shows a mode in which energy is transferred from the resonance capacitor to the load and the equivalent inductor during parallel resonance between the equivalent inductor and the resonance capacitor, from $t_3$ to $t_0$ of FIG. 3. At $t_3$, the resonance voltage is minimized and gradually increases. When the voltage of the resonance capacitor rises above the DC link voltage, a current begins to flow through the anti-parallel diode of the IGBT, and the resonance capacitor voltage is maintained as the DC link voltage.

In a single-ended resonant inverter for an induction heating cooker, the voltage magnitude due to voltage resonance in parallel depends on the magnitude of current flowing through the working coil when the switching element is turned off, and if this current is small, the resonance voltage is low, and if the current is large, the resonance voltage is high.

In this case, if the magnitude of the generated resonance voltage is smaller than the DC link voltage, the zero voltage switching condition is not satisfied, and thus, the operation is performed as hard switching. In order to perform a high-efficiency switching operation under conditions in which the current flowing in the working coil is small, the switching element must be turned on when the voltage across both ends of the switching element is the lowest. FIG. 4 is an exemplary diagram illustrating a switching operation and a current flowing in a switching element under a condition in which the current flowing in the working coil is small.

In this case, at the resonance frequency formed by the container, the working coil and the vacuum capacitor, and at a frequency away from the resonance frequency, the slope at which the resonance voltage is lowered is different, and thus, the slope at which the resonance voltage is relatively lowered is different such that hard switching occurs. FIG. 5 is an exemplary diagram for explaining the relationship between an output of a single-ended inverter and a frequency.

Therefore, zero voltage switching is performed at the maximum output, which is the resonance frequency, but at the minimum output farthest from the resonance frequency, there is a problem in that heat is generated in the switching element even though the output is relatively low due to hard switching.

In order to solve these problems, Korean Registered Patent No. 10-0692634 (DRIVING CIRCUIT FOR INDUCTION HEATING DEVICE AND THE DRIVING METHOD THEREOF) proposes a method of minimizing loss in a resonance circuit by generating a zero cross pulse signal by comparing the resonance voltage and the compensation voltage and turning on a switching element after a preset delay time has elapsed from the falling edge of the zero cross pulse signal. That is, when the IGBT is turned on at the inflection point of the resonance voltage, the loss is the smallest, and thus, the loss of the driving circuit is minimized by anticipating the time point of inflection and turning on the IGBT at this time point. However, Korean Registered Patent No. 10-0692634 above has a problem in that the flowing current becomes large due to this control, and it is not possible to respond when the resonance voltage increases.

SUMMARY OF THE INVENTION

The present invention has been devised to solve the above problems, and an object of the present invention is to prevent hard switching of a switching element by changing a delay time based on the degree to which the frequency of the switching control signal is separated from the resonance frequency.

In order to solve the technical problem, as described above, the power conversion device for an electric range which is provided with a plate on which an object to be heated is seated and an interface unit for receiving a user's selection of the number of outputs according to an exemplary embodiment of the present invention may include a power supply unit for providing a rectified voltage; a switching element; a working coil which is disposed under the plate and inductively heats the object to be heated by applying the rectified voltage by switching of the switching element; a resonance capacitor which is disposed in parallel with the working coil; a comparator for generating a switching timing reference signal by comparing the rectified voltage and a voltage at both ends of the switching element; a control unit for determining a resonance frequency according to the object to be heated and the number of outputs that are input through the interface unit, determining a delay time according to a difference between the frequency of the switching timing signal and the resonance frequency, and outputting a switching control signal that turns on after the delay time has passed since the falling edge of the switching timing reference signal; and a storage unit for storing a delay time according to a difference between the resonance frequency and the switching timing reference signal.

In an exemplary embodiment of the present invention, the storage unit may store a delay time according to a difference between the resonance frequency and the switching timing reference signal, according to the frequency band of the resonance frequency and the switching timing reference signal, and wherein the control unit may determine a delay time according to the frequency band of the resonance frequency and the switching timing reference signal and a difference between the resonance frequency and the switching timing reference signal.

In an exemplary embodiment of the present invention, the off-time of the switching control signal may be determined by the characteristics of the resonance capacitor and the working coil.

In an exemplary embodiment of the present invention, when the frequency of a switching control signal of the switching element is changed and reaches target power according to the number of outputs, the control unit may determine the frequency of the corresponding switching control signal as a resonance frequency.

In an exemplary embodiment of the present invention, the control unit may apply a damping signal in a standby state to determine the frequency of damping oscillation generated by the resonance capacitor and the working coil as a resonance frequency.

Further, in order to solve the technical problem as described above, the method for controlling a power conversion device for an electric range which is provided with a plate on which an object to be heated is seated and an interface unit for receiving a user's selection of the number of outputs according to an exemplary embodiment of the present invention may include the steps of receiving a user's selection of the number of outputs through an interface unit; determining the resonance frequency from the number of outputs and an object to be heated; comparing a rectified voltage and a voltage at both ends of a switching element, and generating a switching timing reference signal; determining a delay time according to a difference between the resonance frequency and the frequency of the switching timing reference signal; and outputting a switching control signal that turns on after the delay time has passed since the falling edge of the switching timing reference signal.

In an exemplary embodiment of the present invention, the delay time may be determined in advance and stored according to the frequency band of the resonance frequency and the switching timing reference signal, and a difference between the resonance frequency and the switching timing reference signal.

The present invention as described above has the effects of preventing hard switching even at a low stage output with a high frequency of a switching control signal to secure an output holding time and reduce stress on a switching element, and thereby enabling a linear output design.

DETAILED DESCRIPTION OF THE EMBODIMENTS

In order to fully understand the configuration and effects of the present invention, preferred exemplary embodiments of the present invention will be described with reference to the accompanying drawings. However, the present invention is not limited to the exemplary embodiments disclosed below, and may be embodied in various forms and, various modifications may be added. However, the description of the present exemplary embodiments is provided so that the disclosure of the present invention is complete, and to fully inform the scope of the invention to those of ordinary skill in the art to which the present invention pertains. In the accompanying drawings, components are enlarged in size from reality for the convenience of description, and the ratios of each component may be exaggerated or reduced.

Terms such as 'first' and 'second' may be used to describe various components, but the components should not be limited by the above terms. The above terms may be used only for the purpose of distinguishing one component from another. For example, without departing from the scope of the present invention, a 'first component' may be termed a 'second component', and similarly, a 'second component' may also be termed a 'first component'. In addition, the singular expression includes the plural expression unless the context clearly dictates otherwise. Unless otherwise defined, terms used in the exemplary embodiments of the present invention may be interpreted as meanings commonly known to those of ordinary skill in the art.

Hereinafter, the power conversion device according to an exemplary embodiment of the present invention and a control method thereof will be described with reference to the drawings.

Figure 6:
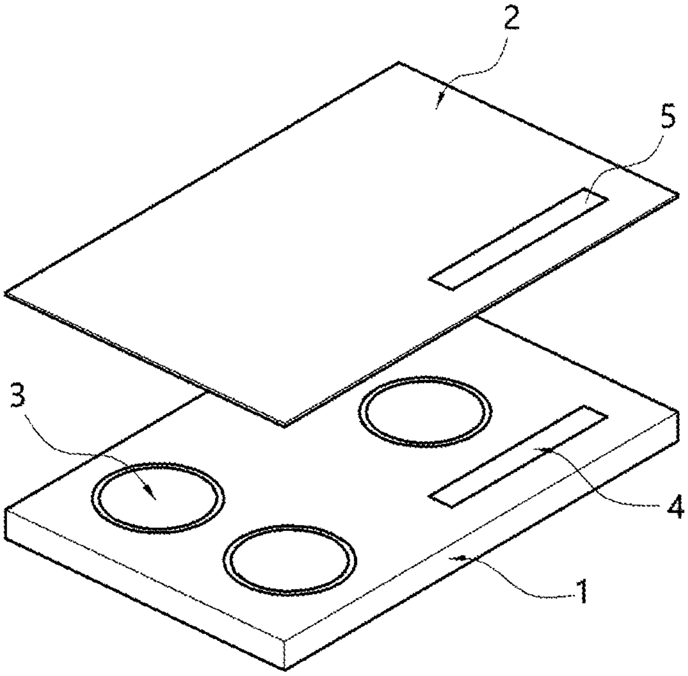
FIG. 6 is an external configuration diagram of an electric range to which the power conversion device of an exemplary embodiment of the present invention is applied.

FIG. 6 is an external configuration diagram of an electric range to which the power conversion device of an exemplary embodiment of the present invention is applied.

Referring to FIG. 6, the electric range to which an exemplary embodiment of the present invention is applied may include a case 1 constituting the main body and a cover plate 2 which is coupled to the case 1 to seal the case 1.

The cover plate 2 is coupled to the upper surface of the case 1 to seal a space formed inside the case 1 from the outside, and it may be composed of a material (e.g., ceramic glass, etc.) which is capable of well transferring heat generated from a heat generating unit 3 to an object to be heated, which is disposed in an area corresponding to the heat generating unit 3.

A plurality of heat generating units 3 for heating an object to be heated may be disposed in the case 1. In addition, an interface unit 4 for allowing a user to apply power or adjust the output of the heat generating unit 3 or displaying information related to an electric range may be disposed on the upper surface of the case 1. The interface unit 4 may be formed of a touch panel which is capable of both inputting information and displaying information by touch, but an interface unit 4 having a different structure may be used according to an exemplary embodiment. That is, for example, it may be formed of a button-type interface unit or a dial-type interface unit.

When the user inputs information such as the number of outputs through the interface unit 4, it may be transmitted to a control unit (to be described below) which is disposed inside the case 1.

In the description of the present invention, an example in which the heat generating unit 3 and the interface unit 4 are disposed in the case 1 is described, but this is for the convenience of explanation, and it is apparent that a plurality of other components for driving an electric range other than the above can be arranged.

The cover plate 2 may be provided with a manipulation area 5 which is disposed at a position corresponding to the interface unit 3. For user manipulation, characters or images may be pre-printed on the manipulation area 5. The user may perform a desired operation by touching a specific point of the manipulation area 5 with reference to pre-printed characters or images. In addition, information which is output by the interface unit 4 may be displayed through the cover plate 2. When the interface unit 4 is configured in a manner other than the touch method, the manipulation area 5 may be configured to correspond to the configuration method of the corresponding interface unit 4. For example, the manipulation area 5 corresponding to the button-type or dial-type interface unit 4 may have a simple structure exposing the corresponding interface unit 4.

In the exemplary embodiment of FIG. 6, an example in which three heat generating units 3 are disposed inside the case 1 is illustrated, but in another exemplary embodiment of the present invention, one or two heat generating units may be disposed inside the case 1, or three or more heating units may be disposed. In addition, although the schematic structure of an electric range is illustrated in FIG. 6, it is apparent that various configurations may be included in the electric range.

In an exemplary embodiment of the present invention, the heat generating unit 3 may include a working coil that forms an induced magnetic field by using the supplied high-frequency alternating current. That is, when a current flows through the working coil, a magnetic field is formed in the working coil, and the magnetic field generates an eddy current in a cooking container that is magnetically coupled to the working coil, thereby heating the object to be heated and cooking food. In this case, the electric range may be an induction heating-type cooking appliance. Alternatively, the heat generating unit 3 may include a heating wire for heating the cover plate 2. That is, when power is applied to the heating wire, heat is emitted to heat the object to be heated which is seated on the cover plate 2 to cook food. In this case, the electric range may be a highlight-type cooking appliance. As described above, the electric range of the present invention may be an induction heating-type cooking device or a highlight-type cooking device, but an exemplary embodiment in which the heat generating unit 3 is a working coil will be described below.

Figure 1:
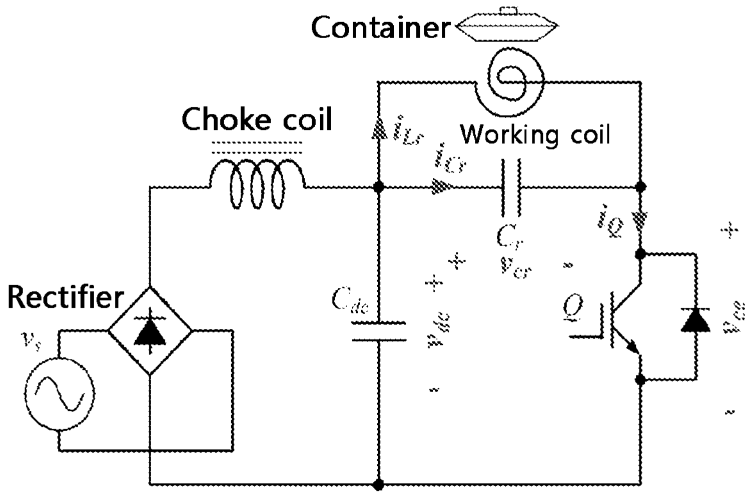
FIG. 1 is a circuit diagram of a single-ended resonant inverter used in an induction heating cooker.

Again, referring to FIG. 1, a control unit to be described below is disposed in a space formed inside the case 1 to receive a user's input through the interface unit 4, and by controlling the on/off of the switching element to be described below according to the user's input, it is possible to control the power supply to the working coil.

Hereinafter, the operation of the power conversion device according to an exemplary embodiment of the present invention for applying power to the heat generating unit 3, which is a working coil, will be described with reference to the drawings.

Figure 7:
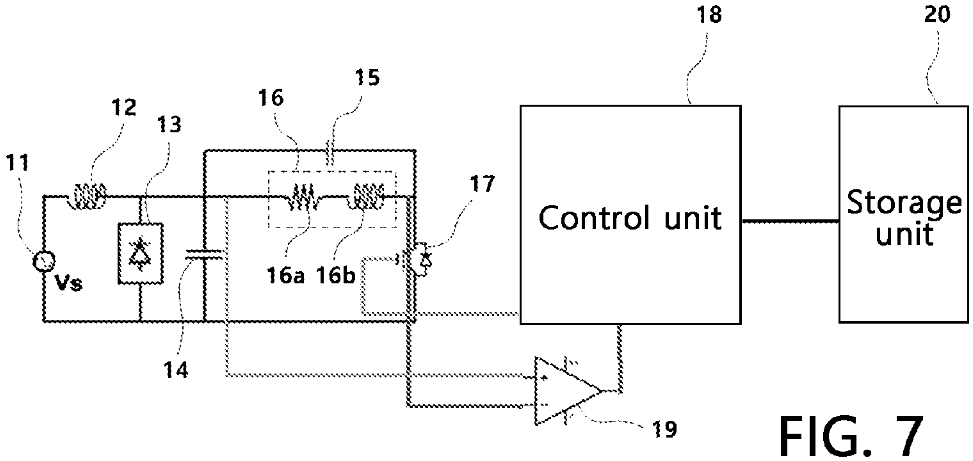
FIG. 7 is a circuit diagram for schematically describing the configuration of a power conversion device for applying power to a working coil according to an exemplary embodiment of the present invention.

FIG. 7 is a circuit diagram for schematically describing the configuration of a power conversion device for applying power to a working coil according to an exemplary embodiment of the present invention.

As illustrated in the drawings, the power conversion device according to an exemplary embodiment of the present invention may include a power supply unit 11, a choke coil 12, a rectifying unit 13, a DC link capacitor 14, an equivalent resistor 16*a* and an equivalent inductor 16*b* constituting a working coil 16, a resonance capacitor 15 which is disposed in parallel with the working coil 16, a switching element 17, a control unit 18, a comparator 19 and a storage unit 20.

Such a single-ended power conversion device inserts the resonance capacitor 15 in parallel with the working coil 16 to generate voltage resonance such that a high resonance voltage is generated. Since the size of the resonance voltage is designed to be around 700V, the voltage applied to both ends of the switching element 17 exceeds 1,000V. Therefore, as the switching element 17 used in the power conversion device having such a structure, an insulated gate bipolar transistor (IGBT) having a rated voltage of 1,200V or more may be used, but the present invention is not limited thereto, and various semiconductor devices for power may be used.

The rectifying unit 13 may rectify the AC voltage supplied from the power applying unit 11 to output a rectified voltage. The choke coil 12 may smooth the rectified voltage to remove a ripple included in the rectified voltage. That is, the choke coil 12 is connected for the purpose of blocking a high-frequency signal at a predetermined frequency or higher, and other elements that perform such a function may be disposed, and these may be disposed at other positions besides the position of the choke coil in FIG. 7.

The DC link capacitor 14 may function as a power source for applying a rectified voltage to the working coil 16. In a single-ended power converter, a capacitor with a small capacity is used to obtain a high power factor only by the operation of a power converter without a separate power factor compensation circuit, and thus, the DC link voltage may be an unsmoothed pulsating current.

Figure 2:
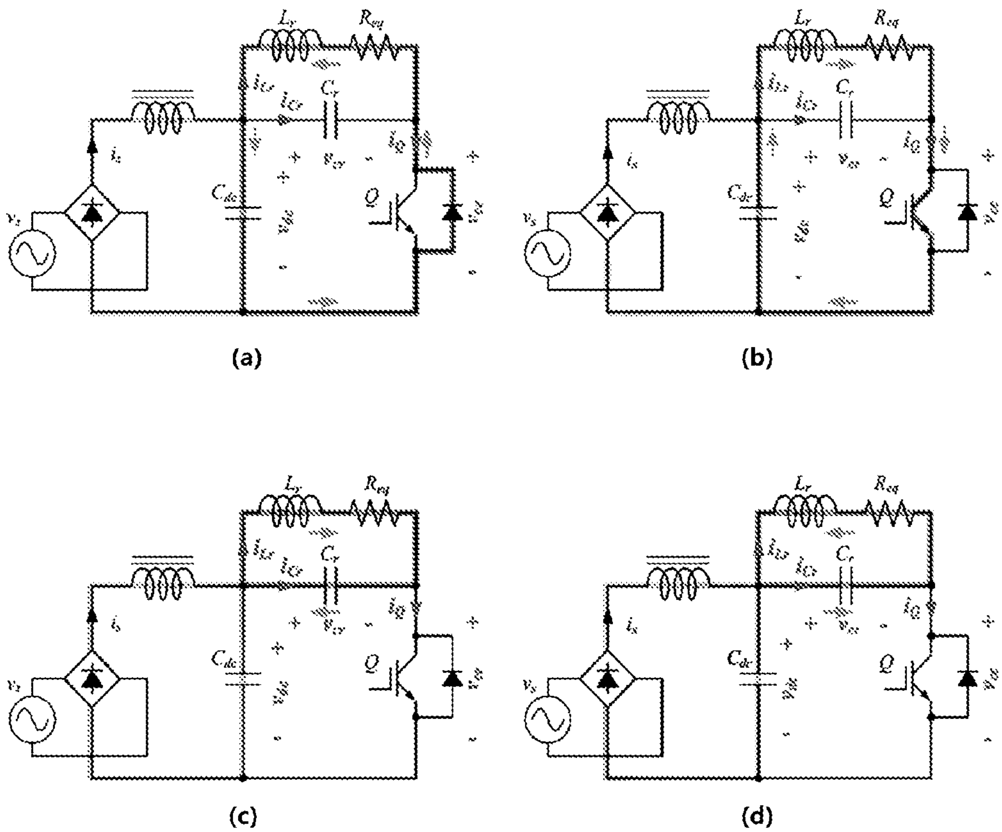
FIG. 2 is an exemplary diagram illustrating the operation of the resonant inverter of FIG. 1.
Figure 3:
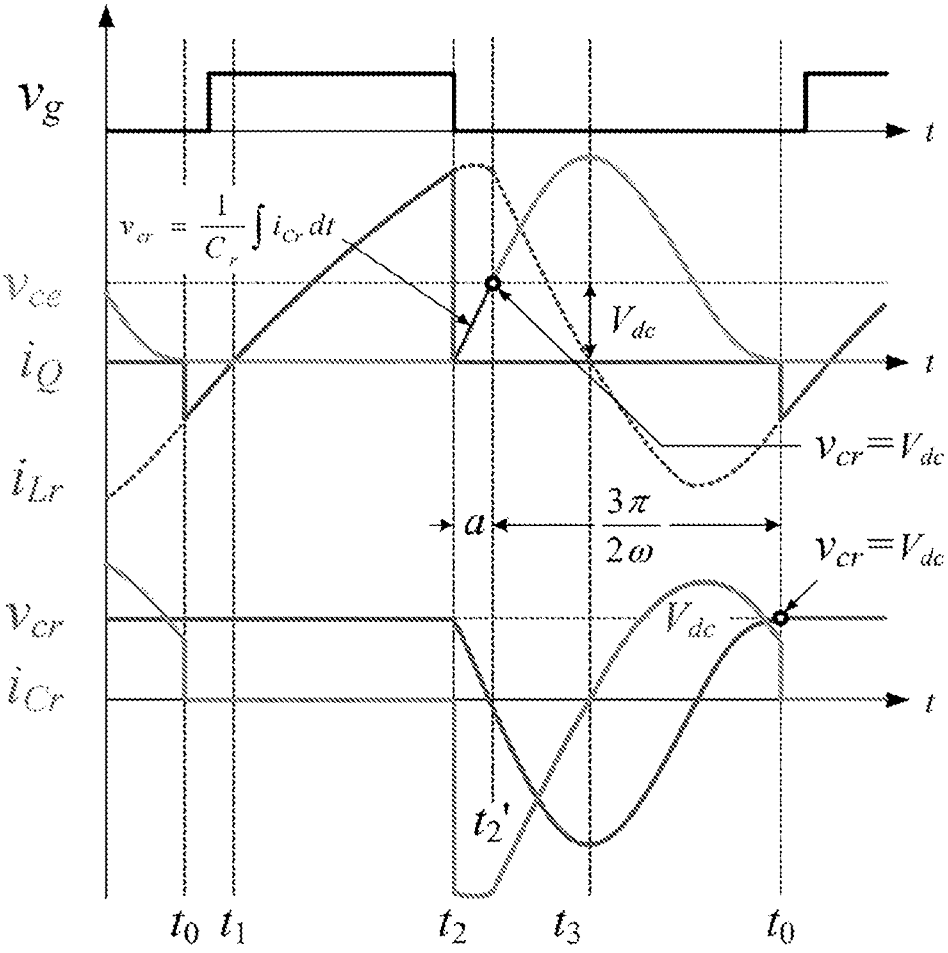
FIG. 3 shows the theoretical waveforms of voltage and current in each mode.

According to the number of outputs of the electric range which is input by the user, the control unit 18 may generate and output a switching control signal for controlling the switching element 18. In this case, the switching control signal may be, for example, a gate driving signal for the IGBT. The switching element 18 that has received a switching control signal is switched on or off based on the corresponding switching control signal, whereby a rectified voltage is applied to the working coil 16, and by the operation as shown in FIG. 2, heat may be transferred to an object to be heated which is seated on the cover plate 2 by an induced current generated in the working coil 16.

When the user seats an object to be heated on the cover plate 2 and selects the number of outputs through the interface unit 4, the control unit 18 according an exemplary embodiment of the present invention may determine the resonance frequency according to the coupling characteristics with the object to be heated.

In addition, the control unit 18 may determine a switching control signal according to the number of outputs selected by the user, and in this case, the control unit 18 may determine the switching control signal by which the comparator 19 compares the resonance voltage and the DC link voltage.

Specifically, since a voltage vce across both ends of the switching element 17 is represented by the sum of a DC link voltage vdc and a voltage vcr of the resonance capacitor 15, the comparator 19 compares the voltage vce across both ends of the switching element 17 and the DC link voltage vdc so as to generate a switching timing reference signal, and this may be input to the control unit 18. In this case, the control unit 18 may measure the pulse width of the switching timing reference signal corresponding to a half cycle of the resonance voltage, and may determine the frequency of the corresponding switching timing reference signal.

Figure 5:
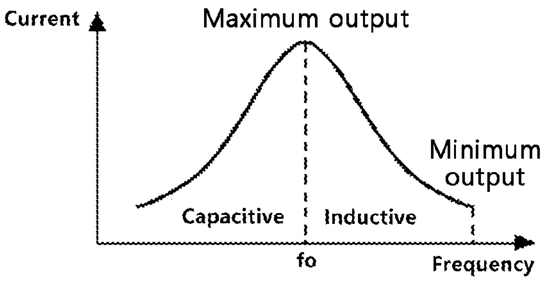
FIG. 5 is an exemplary diagram for explaining the relationship between an output of a single-ended inverter and a frequency.

Meanwhile, the control unit 18 may determine the delay time by comparing the resonance frequency and the frequency of the switching timing reference signal. Referring to FIG. 5, at a high output, the resonance frequency and the frequency of the switching control signal become similar, and soft switching is possible, but at a low output, a phenomenon occurs in which the resonance voltage increases as the frequency of the switching control signal becomes higher than the resonance frequency, and therefore, there is no choice but to perform hard switching.

Accordingly, the control unit 18 of the present invention may determine the delay time according to the difference between the resonance frequency and the frequency of the switching timing reference signal. In this case, as the difference between the resonance frequency and the frequency of the switching timing reference signal is greater, the delay time may be determined to be greater.

In this case, the delay time according to the difference between the two frequencies may be determined in advance and stored in the storage unit 20, and the control unit 18 may determine the delay time due to the difference between the two frequencies and determine a switching control signal which is a PWM signal after the delay time has passed since the falling edge of the switching timing reference signal. The delay time may be, for example, 1 to 5 μs. If the delay time is too long, the timing at which the resonance voltage rises is turned on, and there is a possibility that the switching element 17 may be damaged.

Figure 8:
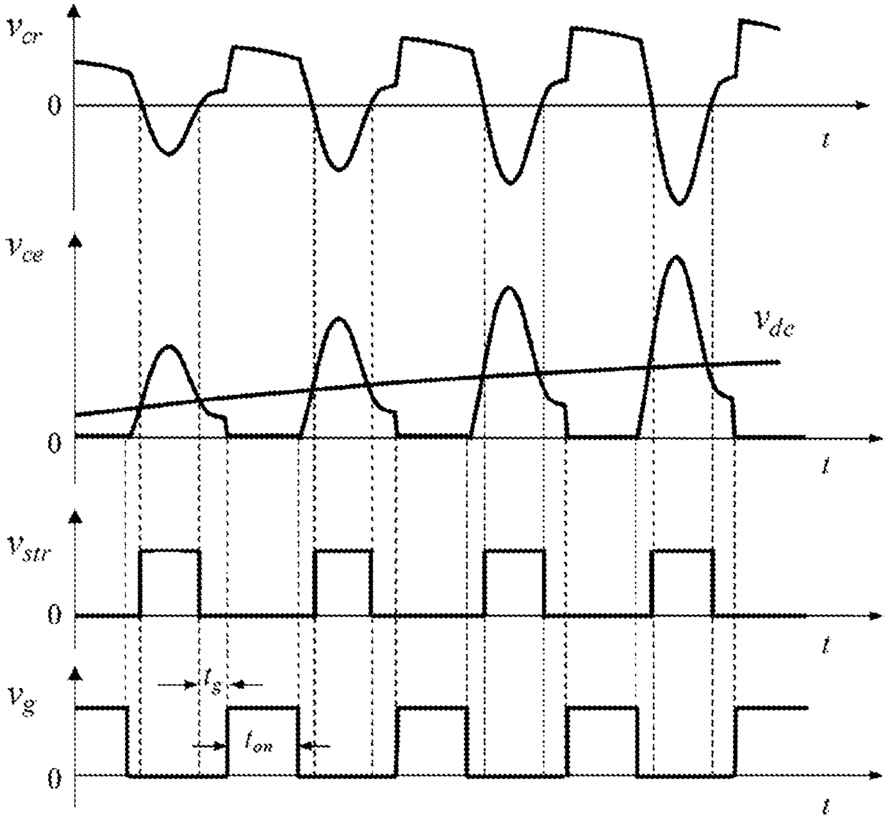
FIG. 8 is an exemplary diagram illustrating the driving timing diagram of a switching element.

FIG. 8 is an exemplary diagram illustrating the driving timing diagram of a switching element.

The comparator 19 may compare the voltage vce across both ends of the switching element 17 and the DC link voltage vdc to generate a switching timing reference signal vstr, and the control unit 18 may check the frequency of a timing reference signal which is determined by the comparator 19.

Thereafter, the control unit 18 may determine a delay time tg according to the difference between the resonance frequency and the frequency of the switching timing reference signal, and determine a switching control signal vg in which the on-time of the switching timing reference signal is delayed according to the delay time tg. In this case, the off-time of the switching control signal, which is a PWM signal, may be determined by the LC resonance of the resonance capacitor 15 and the working coil 16. That is, if the on-time of the switching control signal is determined, the off-time may be determined by circuit characteristics.

The switching element 17 receiving the switching control signal may generate an induced current in the working coil 16 by repeatedly turning on or off according to the corresponding switching control signal.

Hereinafter, the operation of the control unit 18 will be described with reference to the drawings.

Figure 9:
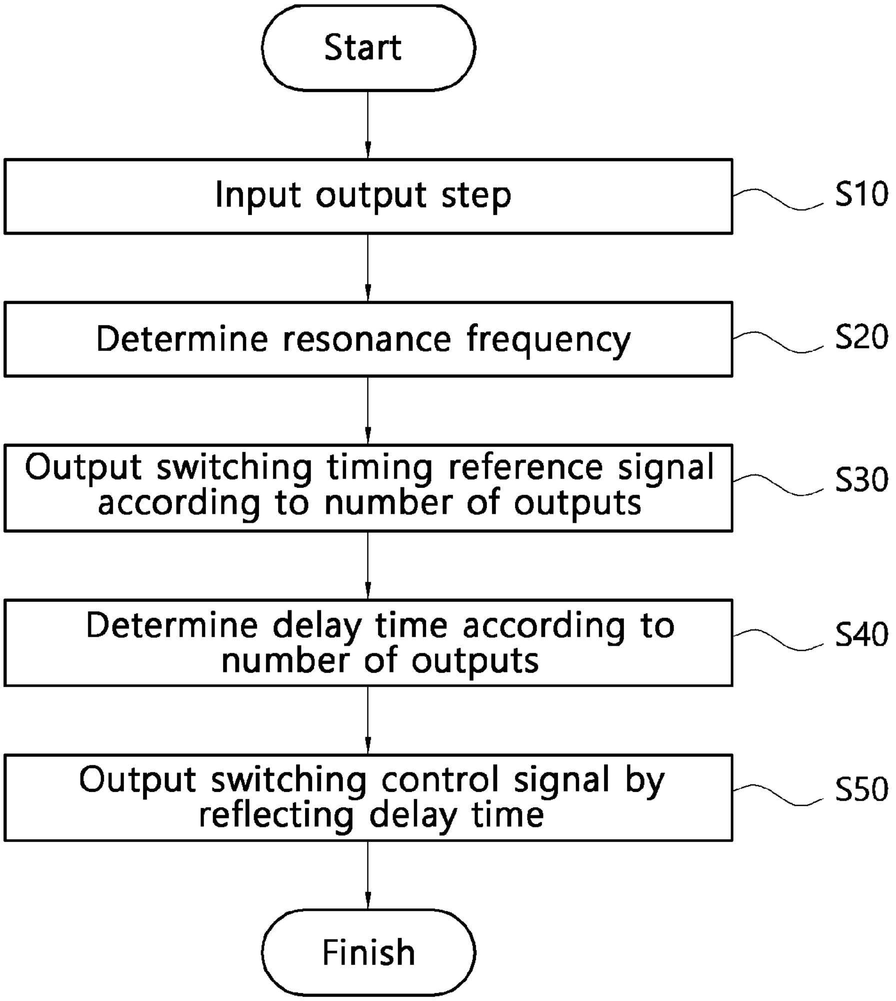
FIG. 9 is a flowchart illustrating the operation of the control unit of FIG. 7.

FIG. 9 is a flowchart illustrating the operation of the control unit of FIG. 7.

As illustrated in the drawings, in an exemplary embodiment of the present invention, the user may input the number of outputs of the electric range through the interface unit 4 of the electric range S10, and the control unit 18 may receive the number of outputs selected by the user from the interface unit 4 and determine the resonance frequency from the number of outputs and the object to be heated on the upper part of the cover plate 2 S20.

Since the resonance frequency and switching control band of an electric range change the equivalent resistor 16*a* and the equivalent inductor 16*b* formed with the working coil 16 according to the material of the object to be heated, the manufacturing method, the appearance and the like, the resonance frequency and the switching control band may be changed. In addition, the frequency of the switching control signal may be changed according to the number of outputs which is input by the user through the interface unit 4.

In addition, even when the same number of outputs is set for an object to be heated of the same material, appearance and manufacturing method, if the position of the container is moved from the original position with respect to the working coil 16, the inductance of the equivalent inductor 16*b* is changed such that the resonance frequency may be changed.

Accordingly, when the user inputs the number of outputs, the control unit 18 may determine the resonance frequency at the corresponding time point.

In this case, the control unit 18 may determine the frequency of the corresponding switching control signal as the resonance frequency, when the frequency of the switching control signal is changed to target power according to the number of output stages and reaches the target power.

Alternatively, the control unit 18 may determine the resonance frequency by the initial damping oscillation, and when a switching control signal (damping signal) between 1 and 5 μs is applied once in a standby state, damping oscillation occurs at the resonance tank (resonance capacitor 15 and working coil 16), and in this case, the control unit may determine the frequency of the damping oscillation as a resonance frequency.

However, the present invention is not limited to the determination of the resonance frequency according to an exemplary embodiment, and the control unit 18 may determine the resonance frequency in more various ways.

Thereafter, the comparator 19 may output a switching timing reference signal according to the number of outputs S30. Referring to FIG. 8, the comparator 19 may compare a voltage vce across both ends of the switching element 17 and a DC link voltage vdc so as to output a switching timing reference signal vstr. In this case, the control unit 18 may determine the frequency of the switching timing reference signal.

Thereafter, the control unit 18 may compare the resonance frequency with the frequency of the switching timing reference signal to determine the delay time according to the degree to which the frequency of the switching timing reference signal is greater than the resonance frequency S40. In the conventional case, a control signal that turns on after delaying the switching timing reference signal for a certain period of time is output, but as the frequency of the control signal increases compared to the resonance frequency, the falling timing of the resonance voltage increases such that it has not been possible to respond to hard switching with a fixed delay time.

In an exemplary embodiment of the present invention, the storage unit 20 may create and store the delay time in a table such that the delay time increases as the frequency of the switching timing reference signal increases with respect to the resonance frequency, and the control unit 18 may determine a delay time according to a difference between the resonance frequency and the frequency of the switching timing reference signal from the storage unit 20.

In this case, the delay time stored by the storage unit 20 may be changed according to the resonance frequency and the band of the switching timing reference signal. That is, as the frequency band is lower, the period of the resonance voltage becomes longer, and the falling time becomes much longer. Therefore, as the frequency band is lower, the delay time is made to be longer and stored in the storage unit 20, and the control unit 18 may determine the delay time according to the resonance frequency and the frequency band of the switching timing reference signal.

That is, the storage unit 20 may store the delay time in a table based on two variables of the band of the resonance frequency and the switching timing reference signal, and the difference between the resonance frequency and the frequency of the switching timing reference signal.

Thereafter, the control unit 18 may determine a switching control signal vg that is turned on after a delay time tg has passed since the falling edge of the switching timing reference signal S50. That is, the switching control signal, which is a PWM signal, may be determined to be turned on after the delay time tg has passed since the falling edge of the switching timing reference signal and to be turned off after a pulse width ton which is determined by the resonance tanks 15, 16.

Figure 4:
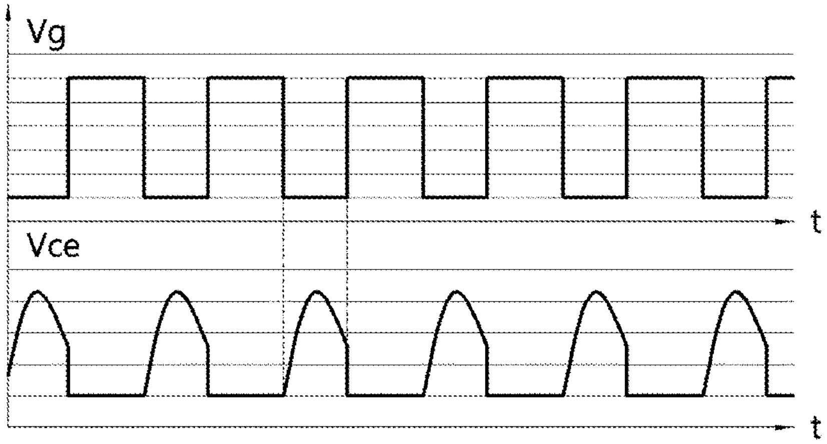
FIG. 4 is an exemplary diagram illustrating a switching operation and a current flowing in a switching element under a condition in which the current flowing in the working coil is small.
Figure 10:
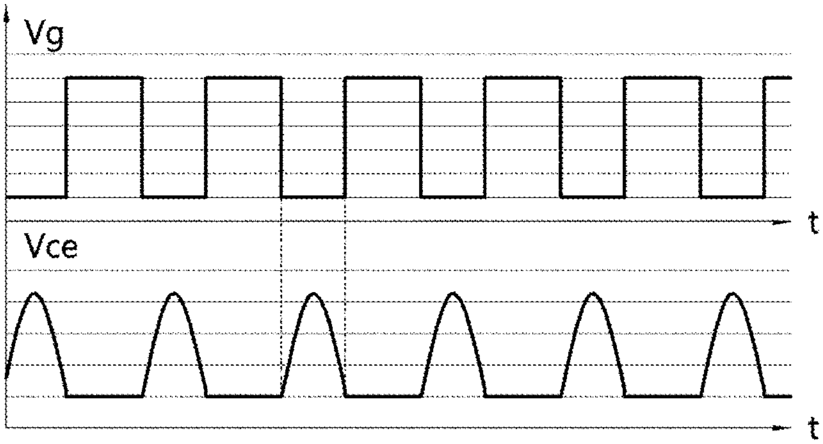
FIG. 10 is a diagram showing that soft switching occurs by changing the switching control signal vg according to the present invention.

By such control, hard switching that occurs as shown in FIG. 4 may be changed to soft switching as shown in FIG. 10.

FIG. 10 is a diagram showing that soft switching occurs by changing the switching control signal vg according to the present invention.

According to the present invention as described above, it has the effects of preventing hard switching even at a low stage output with a high frequency of a switching control signal to secure an output holding time and reduce stress on a switching element, and thereby enabling a linear output design.

Although the exemplary embodiments according to the present invention have been described above, these are merely exemplary, and those of ordinary skill in the art will understand that various modifications and equivalent ranges of exemplary embodiments are possible therefrom. Accordingly, the true technical protection scope of the present invention should be defined by the following claims.

The power conversion device for an electric range according to the present invention and a control method thereof can be implemented in various home appliances used at home or in an industrial field and a controller for controlling the same, and thus have industrial applicability.

What is claimed is:

1. A power conversion device for an electric range which is provided with a plate on which an object to be heated is seated and an interface unit for receiving a user's selection of a number of outputs, comprising:

a power supply unit for providing a rectified voltage;

a switching element;

a working coil which is disposed under the plate and inductively heats the object to be heated by applying the rectified voltage by switching of the switching element;

a resonance capacitor which is disposed in parallel with the working coil;

a comparator for generating a switching timing reference signal by comparing the rectified voltage and a voltage at both ends of the switching element;

a control unit for determining a resonance frequency according to the object to be heated and the number of outputs that are input through the interface unit, determining a delay time according to a difference between a frequency of the switching timing signal and the resonance frequency, and outputting a switching control signal that turns on after the delay time has passed since a falling edge of the switching timing reference signal; and a storage unit for storing the delay time according to a difference between the resonance frequency and the switching timing reference signal.

2. The power conversion device of claim 1, wherein the storage unit stores the delay time according to a difference between the resonance frequency and the switching timing reference signal, according to a frequency band of the resonance frequency and the switching timing reference signal, and wherein the control unit determines the delay time according to the frequency band of the resonance frequency and the switching timing reference signal and a difference between the resonance frequency and the switching timing reference signal.

3. The power conversion device of claim 1, wherein an off-time of the switching control signal is determined by characteristics of the resonance capacitor and the working coil.

4. The power conversion device of claim 1, wherein when the frequency of a switching control signal of the switching element is changed and reaches target power according to the number of outputs, the control unit determines the frequency of the corresponding switching control signal as a resonance frequency.

5. The power conversion device of claim 1, wherein the control unit applies a damping signal in a standby state to determine a frequency of damping oscillation generated by the resonance capacitor and the working coil as a resonance frequency.

6. A method for controlling a power conversion device for an electric range which is provided with a plate on which an object to be heated is seated and an interface unit for receiving a user's selection of a number of outputs, the method comprising the steps of:

receiving a user's selection of the number of outputs through an interface unit;

determining a resonance frequency from the number of outputs and an object to be heated;

comparing a rectified voltage and a voltage at both ends of a switching element, and generating a switching timing reference signal;

determining a delay time according to a difference between the resonance frequency and a frequency of the switching timing reference signal; and outputting a switching control signal that turns on after the delay time has passed since a falling edge of the switching timing reference signal.

7. The method of claim 6, wherein the delay time is determined in advance and stored according to a frequency band of the resonance frequency and the switching timing reference signal, and a difference between the resonance frequency and the switching timing reference signal.

* * * * *